United States Patent
Yokoyama

(10) Patent No.: US 6,449,007 B1
(45) Date of Patent: *Sep. 10, 2002

(54) METHOD FOR ESTABLISHING SYNCHRONIZATION IN HEAD-DETACHABLE IMAGE SENSING SYSTEM, AND IMAGE SENSING SYSTEM ADOPTING THE METHOD

(75) Inventor: Toshihiko Yokoyama, Zama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/898,293

(22) Filed: Jul. 22, 1997

(30) Foreign Application Priority Data

Jul. 25, 1996 (JP) ............................................. 8-213252

(51) Int. Cl.$^7$ .................................................. H04N 7/18

(52) U.S. Cl. ................................. 348/73; 72/65; 72/207

(58) Field of Search ............................. 348/65, 72, 73, 348/207, 222; 358/909.1

(56) References Cited

U.S. PATENT DOCUMENTS

| | | | | |
|---|---|---|---|---|
| 4,214,261 A | * | 7/1980 | Bazin et al. ................. | 348/519 |
| 5,585,840 A | * | 12/1996 | Watanabe et al. ............. | 348/66 |
| 5,696,553 A | * | 12/1997 | D'Alfonso et al. ......... | 348/211 |
| 5,778,008 A | * | 7/1998 | Shimizu et al. ............. | 714/736 |
| 5,851,257 A | * | 12/1998 | Sakata ........................ | 348/241 |

\* cited by examiner

*Primary Examiner*—Wendy R. Garber
*Assistant Examiner*—Mitchell White
(74) *Attorney, Agent, or Firm*—Morgan&Finnegan, LLP

(57) ABSTRACT

In a system when a camera head and a signal processing unit connected to each other, the signal processing unit inputs a synchronizing signal from an external device, and transmits reference signals, such as a clock signal, horizontal and vertical synchronizing signals based on the input synchronizing signal to the camera head. Further, the signal processing unit controls the camera head so as to select a predetermined signal and output it via a predetermined signal line. When the predetermined signal received by the signal processing unit, the signal processing unit detects phase difference between phase of the predetermined signal and one of the reference signals corresponding to the predetermined signal, and shifts the one of the reference signals so that the phase difference reduces. Thereby, the camera head and the signal processing unit are synchronized.

30 Claims, 5 Drawing Sheets

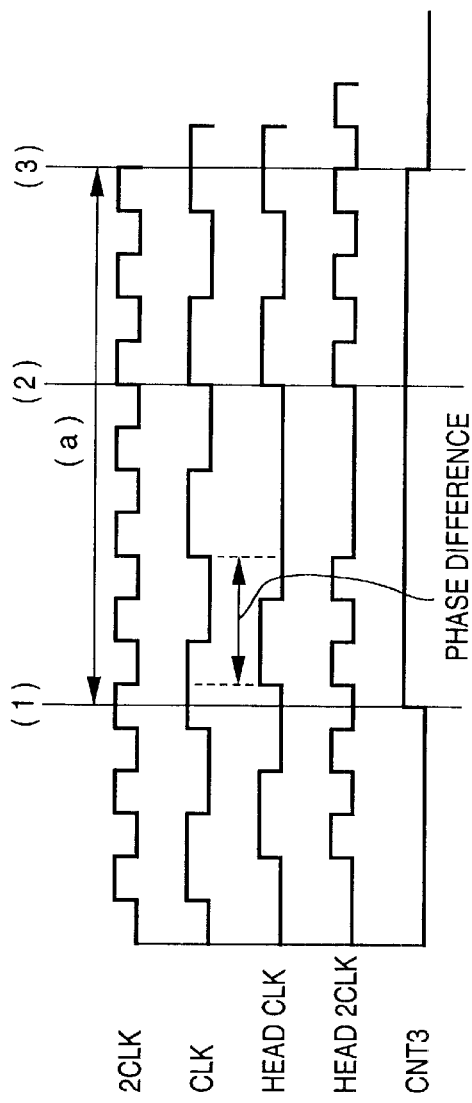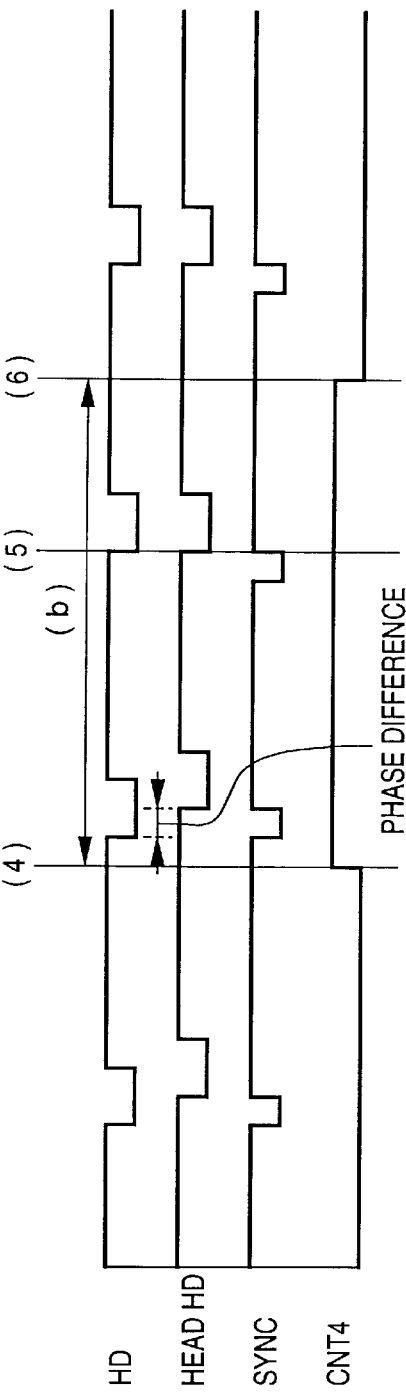

METHOD FOR ESTABLISHING SYNCHRONIZATION IN HEAD-DETACHABLE IMAGE SENSING SYSTEM, AND IMAGE SENSING SYSTEM ADOPTING THE METHOD

BACKGROUND OF THE INVENTION

The present invention relates to an image sensing method, an image sensing apparatus, and an image sensing system and, more particularly, to a method for establishing synchronization between an image sensing unit and a signal processing unit connected with a cable, or the like, in an image sensing system, and an image sensing apparatus and an image sensing system adopting the method.

A variety of image sensing systems, so-called head-detachable cameras, using a solid-state image sensing device, such as a charge-coupled device (CCD), have been proposed. In such systems, an image sensing unit (camera head) and a signal processing unit for processing signals from the image sensing unit and outputting as video signals are separately configured, and connected with a cable, or the like.

Further, an image sensing apparatus using a CCD has been down-sized and down-weighed, and a variety of methods for processing image signals obtained from a CCD in digital form by using high-speed analog-digital (A/D) converter and digital-analog (D/A) converter, realized in the progress of semiconductor manufacturing technique, have been proposed.

Although operability of these head-detachable camera is good, however, a cable for exchanging various kinds of signals, such as an image signal read from a CCD (referred as "CCD signal", hereinafter), a horizontal synchronizing (HD) signal, a vertical synchronizing (VD) signal, and a clock signal (CLK) for establishing synchronization, and other control signals, costs considerable. Further, when the signals CLK and HD, and the CCD signal are transmitted via different signal lines, if the lengths of the signal lines become slightly different from each other by changing the length of the cable, problems in which synchronization is not established and which color signals are reversed may arise because of signal delay in cable. Further, a conventional image sensing system does not have an input unit for inputting synchronizing signal from an external device, it is difficult to establish synchronization between a camera head and a signal processing unit connected to each other.

FIG. 6 is a block diagram illustrating a configuration of a conventional image sensing system. In FIG. 6, reference numeral 200 denotes a camera head, and reference numeral 300 denotes a signal processing unit. In the camera head 200, reference numeral 61 denotes CCD; 62, a sample-and-hold (S/H) circuit for sampling and holding CCD signals; 63, an automatic gain controller (AGC) for controlling a gain for a CCD signal; 64, a timing signal generator (TG) for generating timing signals necessary for the CCD 61, the S/H circuit 62, and so on; and 67, a CPU for controlling each units of a camera head. To the TG 64, a clock signal 2CLK having twice higher frequency than that of a clock signal CLK outputted by the TG 64 is provided. As for the clock signal 2CLK to be provided to the TG 64, in order to increase time precision of various timing signals for operating the CCD 61, one having twice higher frequency than that of the clock signal CLK outputted by the TG 64 is required.

A cable 68 connects the camera head 200 and the signal processing unit 300, and the CCD signals, a clock signal CLK which is synchronized with the CCD signals, and a communication signal RX between the CPU 64 and a CPU 74 are outputted from the camera head 200 to the signal processing unit 300 via the cable 68 which includes a plurality of signal lines. Further, the HD and VD signals for establishing synchronization between the CCD 61 and a digital signal processor (DSP) 70, and a communication signal TX between the CPU 67 and the CPU 74 are outputted from the signal processing unit 300 to the camera head 200 via the cable 68.

The TG 64 establishes horizontal synchronization between the DSP 70 of the signal processing unit 300 and the CCD 61 in accordance with the HD signal. Similarly, the TG 64 establishes vertical synchronization between the DSP 70 and the CCD 61 in accordance with the VD signal. Further, the CPU 67 communicates with the CPU 74 via the communication signals TX and RX, and controls the AGC 63 to adjust the gain for a CCD signal, and also controls an iris diaphragm and zoom lens (not shown) of the camera head 200.

The CCD signals transmitted to the signal processing unit 300 via the cable 68 is converted into digital signals by an analog-digital (A/D) converter 69 in synchronization with the clock signal CLK, applied with digital processes, such as filtering, color separation, Y correction, matrix operation and clipping, which are necessary for color image sensing by the DSP 70. Thereafter, the processed signals are digital-analog converted by a digital-analog (D/A) converter 71, and outputted as signals conforming to NTSC format (video signals).

In the aforesaid example, however, there is a problem in which many signals, such as CCD signals, the HD signal, the VD signal and the clock signal CLK for synchronization, and the communication signals TX and RX, have to be interchanged between the camera head 200 and the signal processing unit 300, and signal lines for transmitting and receiving these signals are necessary, which requires many components for signal transmission and reception, and prevents cost and size of the image sensing system from being reduced.

Further, there is a problem in which, when the length of the cable 68 is changed, because of signal delay, the HD signal, the VD signal and the clock signal CLK may become out of synchronization. Furthermore, when a single CCD each of whose pixels contributes different color component from color components contributed by the neighboring pixels, outputs color CCD signals, if timing of outputting CCD signals and timing of processing the CCD signals by a digital signal processor are out of phase by one pixel period, signals of inverted colors are outputted. For example, a cyan-and-green signal is processed as in the manner for processing a yellow-and-magenta signal, and vice versa.

Further, since a clock generator of the clock signal 2CLK is in the camera head 200 and neither the camera head 200 nor the signal processing unit 300 has an input unit for inputting a synchronizing signal from an external device, thus there is a problem in which synchronization can not be established on the basis of a synchronizing signal from an external device.

SUMMARY OF THE INVENTION

The present invention has been made in consideration of the above situation, and has as its first object to provide an image sensing system having a camera head unit and a signal processing unit connected by a less number of signal lines by transmitting a clock signal, a horizontal synchronizing signal, and a CCD signal via a single signal lines in time division, which establishes synchronization between the camera head unit and the signal processing unit when the length of signal lines are changed.

It is the second object of the present invention to make it easy to synchronize a camera head unit and a signal processing unit by synchronizing with a synchronizing signal generated by an external device.

According to the present invention, the foregoing first object is attained by providing a signal processing apparatus which is used by connecting an external device, the apparatus comprising: transmission means for transmitting reference signals to the external device; control means for controlling the external device so as to output a predetermined signal; reception means for receiving the predetermined signal; and phase shifting means for establishing synchronization with the external device by shifting phases of the reference signals on the basis of the predetermined signal received by the reception means.

According to the present invention, the predetermined signal is preferably selected from plural kinds of signals, and transmitted via a single signal line.

Further, the first object is also attained by providing an image sensing apparatus which is used by connecting an external device, comprising: first input means for inputting reference signals from the external device; second input means for inputting a control signal from the external device; and selection means for selecting a predetermined signal, generated on the basis of the reference signals inputted by the first input means, on the basis of the control signal inputted by the second input means and outputting the selected signal.

Further, the first object is also attained by providing an image sensing system having an image sensing apparatus and a signal processing apparatus comprising: communication means for transmitting reference signals from the signal processing apparatus to the image sensing apparatus; control means for controlling the image sensing apparatus so as to output a predetermined signal generated on the basis of the reference signal; selection means for selecting the predetermined signal under control of the control means; and phase shifting means for synchronizing between the signal processing apparatus and the image sensing apparatus by shifting phases of the reference signals on the basis of the predetermined signal selected by the selection means.

According to the present invention, the selection means preferably selects the predetermined signal out of plural kinds of signals and outputs the selected signal to the phase shifting means via a single signal line.

According to the present invention, the foregoing second object is attained by further providing input means for inputting a synchronizing signal from an external device in addition to the above signal processing apparatus, wherein the reference signals are based on the synchronizing signal inputted by the input means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiment of the invention and, together with the description, serve to explain the principles of the invention.

FIG. 3 is a timing chart for explaining a synchronizing processing of a clock signal;

FIG. 4 is a timing chart for explaining a synchronizing processing of a horizontal synchronizing signal;

DETAILED DESCRIPTION OF THE PREFERRED EMBODIMENT

Preferred embodiment of the present invention will be described in detail in accordance with the accompanying drawings.

Figure 1:
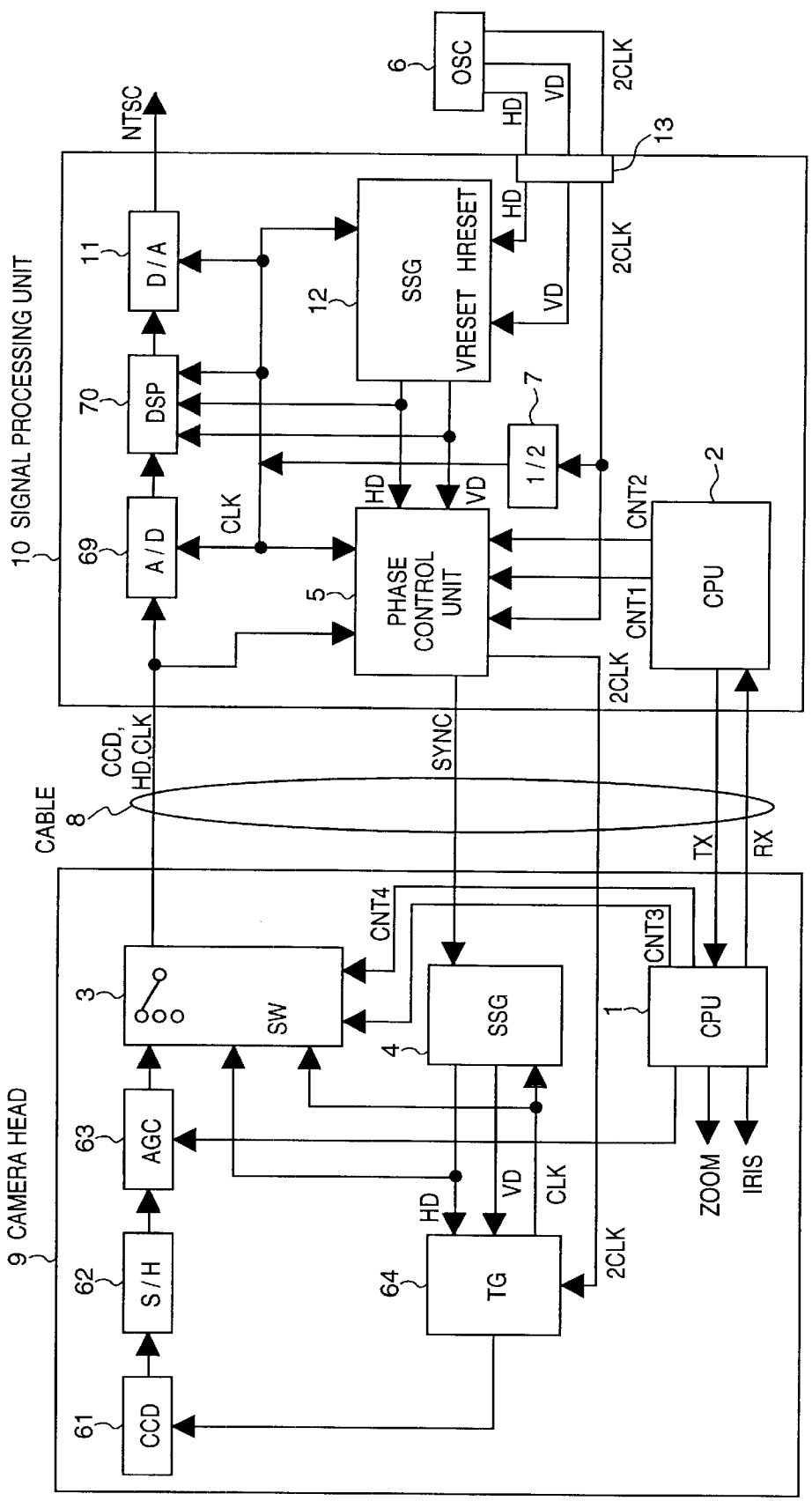
FIG. 1 is a block diagram illustrating a configuration of an image sensing system according to an embodiment of the present invention.

In FIG. 1, reference numeral 9 denotes a camera head; and 10, a signal processing unit. The camera head 9 and the signal processing unit 10 are connected with a cable 8.

In the camera head 9, reference numeral 61 denotes a CCD; 62, a sample-and-hold (S/H) circuit; 63, an automatic gain controller (AGC) for controlling a gain for a CCD signal; and 64, a timing signal generator (TG) for generating a timing signal necessary for the CCD 61, S/H circuit 62, and so on. The above units are the same as those in the conventional image sensing system, and the elements and units described below are distinctive from the conventional image sensing system.

Reference numeral 1 denotes a CPU in the camera head 9, and it communicates with a CPU 2 in the signal processing unit 10 by using the communication signals TX and RX, and executes synchronizing processing, which will be explained later, in accordance with a control signal transmitted from the CPU 2 via the communication signal TX. Further, the CPU 1 also controls the gain in the AGC 63, iris diaphragm and zoom lens (not shown) of the camera head 9. Reference numeral 3 denotes a switch (SW) circuit which switches among a CCD signal from the AGC 63, a horizontal synchronizing (HD) signal, and a clock signal (CLK) under control of the CPU 1, and transmits one of the signals to the signal processing unit 10 via a single signal line (CCD line).

Reference numeral 4 denotes a synchronizing signal generator (SSG) which generates synchronizing signals, such as the HD signal and a vertical synchronizing (VD) signal, in synchronization with a SYNC signal which is a composite signal of a HD signal and a VD signal fed from the signal processing unit 10. Note, the TG 64 adjusts horizontal and vertical synchronization on the basis of the HD and VD signals, respectively, from the SSG 4 when the CCD 61 is operated. Further, the TG 64 halves a frequency of a clock signal (2CLK) which is fed from the signal processing unit 10 and transmits the resultant signal to the SSG 4 as a clock signal (CLK).

Figure 6:
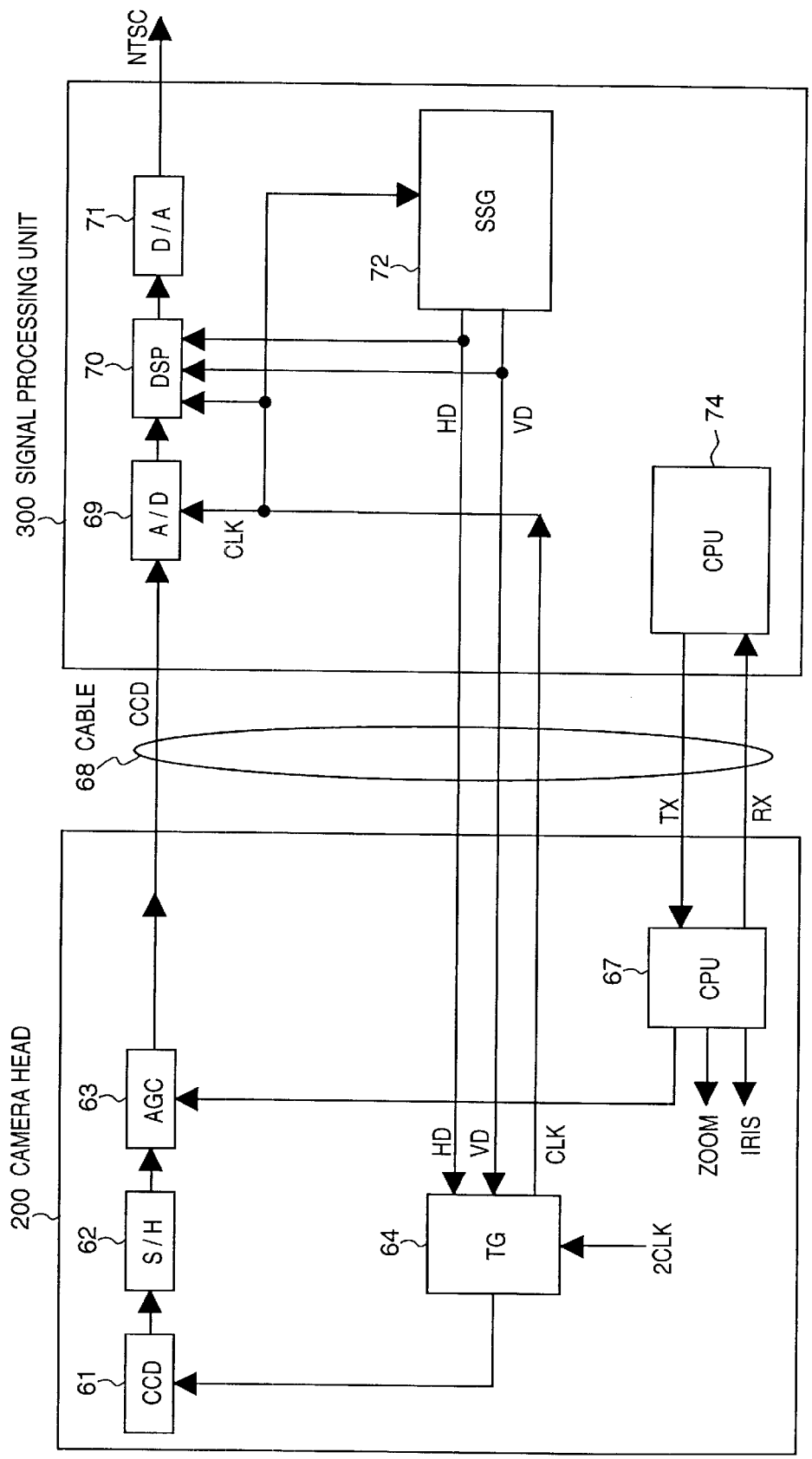
FIG. 6 is a block diagram illustrating a configuration of a conventional image sensing system.

In the signal processing unit 10, reference numeral 69 denotes an analog-digital (A/D) converter for converting a CCD signal into a digital signal; and 70, a digital signal processor for performing digital signal processes, such as filtering, color separation, γ conversion, matrix operation, and clipping, on the digital signal converted by the A/D converter 69. These units are the same as those in the conventional image sensing system shown in FIG. 6, and the units explained in follow are distinctive from the conventional image sensing system.

Reference numeral 2 denotes the CPU in the signal processing unit 10, and it controls the overall processes in signal processing unit 10. For example, it controls a phase control unit 5 by using control signals CNT1 and CNT2. Further, the CPU 2 communicates with the CPU 1 by using the communication signals TX and RX. Reference numeral 11 denotes a digital-analog (D/A) converter which converts a digital signal to an analog signal and outputs to a monitor, or the like, as an NTSC signal, for example. Reference numeral 13 denotes a synchronizing signal input unit for inputting a clock signal, and so on, from an external device. Further, reference numeral 6 denotes an external oscillator for generating a reference clock signal 2CLK, a HD signal, and a VD signal, and inputting these signals to the signal processing unit 10 via the synchronizing signal input unit 13.

The HD and VD signals which are generated by the external oscillator 6 and inputted to the signal processing unit 10 enter a synchronizing signal generator (SSG) 12, and horizontal and vertical synchronization of the signal processing unit 10 with the external oscillator 6 is established. Further, the frequency of the reference clock signal 2LCK is halved by a frequency divider 7, then the resultant clock signal CLK is input to the A/D converter 69, the D/A converter 11, the DSP 70, and the phase control unit 5 as a reference clock.

Reference numeral 5 denotes the phase control unit which shifts to adjust the phase of the clock signal 2CLK from the external oscillator 6, and transmits the phase-shifted clock signal 2CLK to the camera head 9 as a reference clock. Further, the phase control unit 5 adjusts phases of the HD and VD signals from the SSG 12, then transmits these signals to the camera head 9 as the composite signal SYNC (multiplexed signal of HD and VD signals). The camera head 9 uses the composite signal SYNC as reference HD and VD signals. Further, when the power of the system is turned on or right after the camera head 9 and the signal processing unit 10 are connected, the phase control unit 5 adjusts the phases of a clock signal CLK and a HD signal transmitted from the switch circuit 3 of the camera head 9 under control of the CPU 2 by shifting the phases of the clock signal 2CLK and HD signal to be transmitted from the signal processing unit 10 to the camera head 9. The synchronizing processing is explained below with reference to FIGS. 2 to 5.

<<Overall Sequence of Synchronizing Processing between the Camera Head 9 and the Signal Processing Unit 10>>

Figure 5:
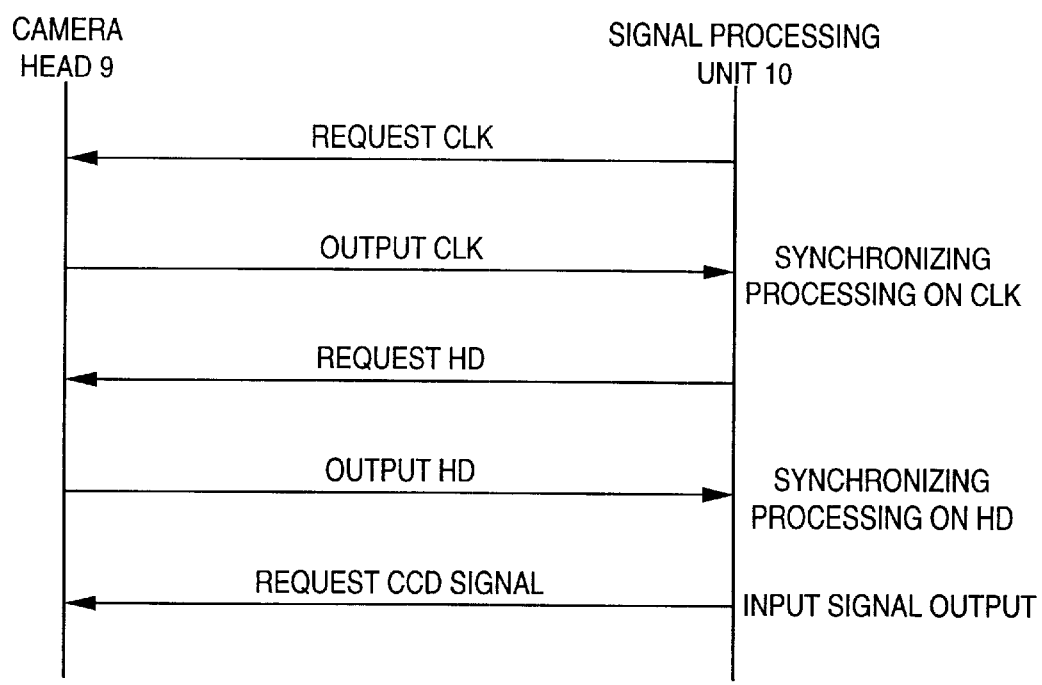
FIG. 5 is a sequential chart for showing a sequence of synchronizing processing in the image sensing system.

An overall sequence of synchronizing processing to be performed when the power of the image sensing system is turned on or just after the camera head 9 and the signal processing unit 10 are connected will be explained below with reference to FIG. 5.

First, the signal processing unit 10 requests, via the communication signal TX, the camera head 9 to output a clock signal CLK. In response to this request, the CPU 1 of the camera head 9 controls the switch circuit 3 by a control signal CNT3 to select the clock signal CLK, then to send it to the signal processing unit 10 via the cable 8. During the period when the control signal CNT3 is HIGH, the switch circuit 3 keeps selecting the clock signal CLK (in this state, a control signal CNT4 is LOW). The signal processing unit 10 performs synchronizing processing on the clock signal CLK while the clock signal CLK is being received.

After the clock signal CLK is synchronized, the signal processing unit 10 requests, via the communication signal TX, the camera head 9 to output a HD signal. In response to this request, CPU 1 of the camera head 9 controls the switch circuit 3 to select a HD signal by the control signal CNT4 and to transmit the HD signal to the signal processing unit 10 via the cable 8. During the period when the control signal CNT4 is HIGH, the switch circuit 3 keeps selecting the HD signal (in this state, the control signal CNT3 is LOW). The signal processing unit 10 performs synchronizing processing on the HD signal while the HD signal is being received.

After the HD signal is synchronized, the signal processing unit 10 requests, via the communication signal TX, the camera head 9 to output CCD signals, thereby normal image signal transmission starts. Note, when both of the control signals CNT3 and CNT4 are LOW, the switch 3 selects the CCD signal.

<<Synchronizing Processing by the Phase Control Unit 5>>

Next, the synchronizing processing on the clock signal CLK and the HD signal performed by the phase control unit 5 will be explained with reference to FIGS. 2 to 4.

Figure 2:
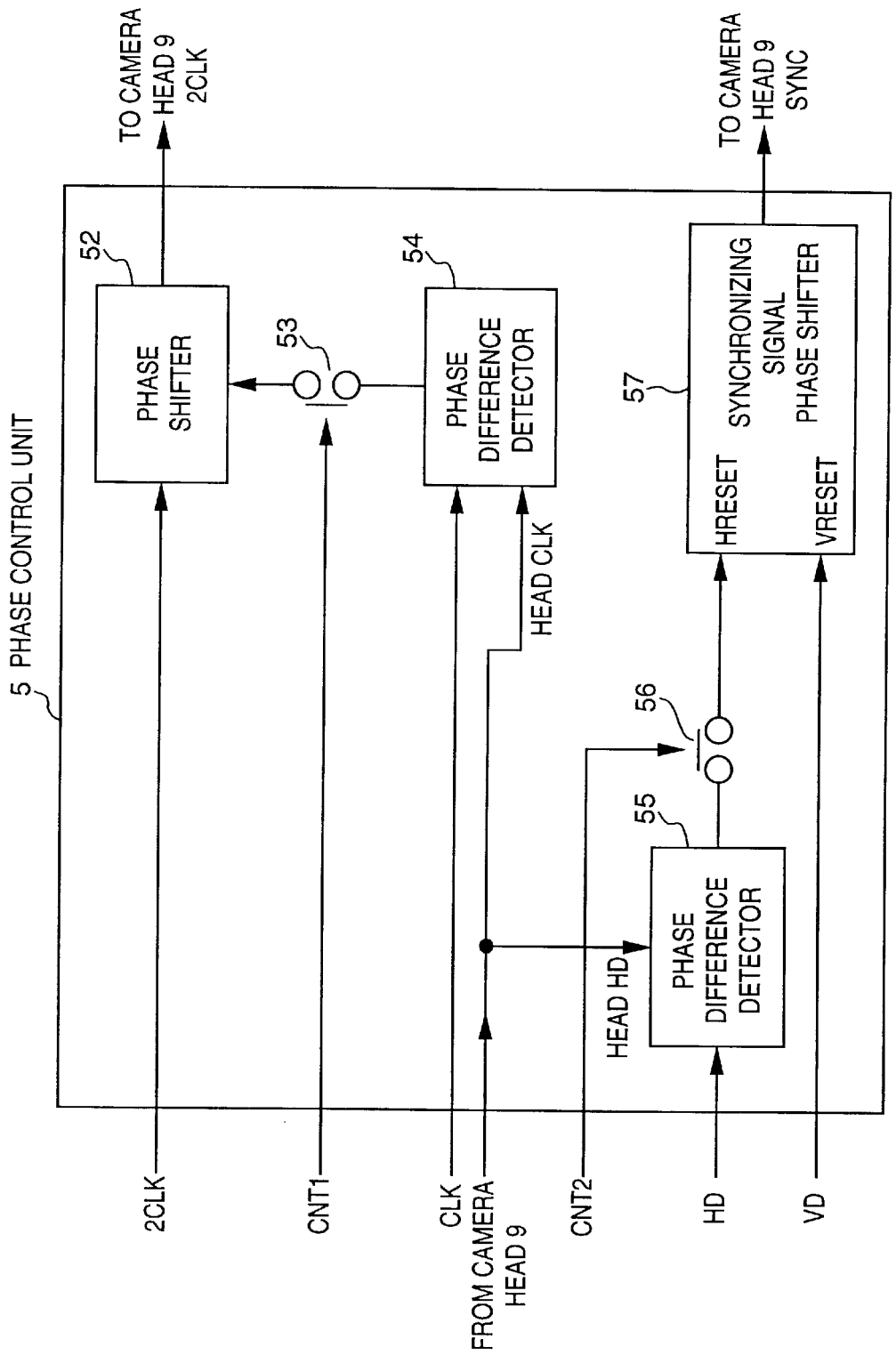
FIG. 2 is a block diagram illustrating a configuration of a phase control unit shown in FIG. 1.

FIG. 2 is a block diagram illustrating a detailed configuration of the phase control unit 5. Referring to FIG. 2, the phase control unit 5 includes a phase shifter 52, a switch 53, another switch 56, a phase difference detector 54 for a clock signal CLK, a phase difference detector 55 for a HD signal, and a synchronizing signal phase shifter 57.

Further, FIG. 3 is a timing chart for explaining timing of the synchronizing processing on a clock signal CLK, and FIG. 4 is a timing chart for explaining timing of the synchronizing processing on a HD signal.

First, the synchronizing processing on a clock signal CLK is explained. The CPU 2 requests, via the communication signal TX, the camera head 9 to output a clock signal CLK. At the same time, the CPU 2 controls the switch 53 to close by the control signal CNT1 while the clock signal CLK is inputted from the camera head 9. The clock signal CLK (called "HEAD CLK", hereinafter, for distinguishing from other clock signals) which is selected by the switch circuit 3 of the camera head 9 in response to the change of the control signal CNT3 from LOW to HIGH (timing (1) in FIG. 3) and kept transmitted during a period (a) in FIG. 3 enters the phase difference detector 54. Further, a clock signal CLK (simply referred as "CLK", hereinafter) which is obtained by halving the clock signal 2CLK by the frequency divider 7 is also inputted to the phase difference detector 54. The phase difference detector 54 compares the HEAD CLK and CLK, and when the phases of the HEAD CLK and CLK are different from each other, it outputs a phase error signal to the phase shifter 52 via the switch 53. In a case shown in FIG. 3, the CLK and HEAD CLK are out of phase by an amount "phase difference" shown by broken lines.

Upon receiving the phase error signal, the phase shifter 52 shifts the phase of the clock signal 2CLK transmitted to the camera head 9 so that the phase error signal becomes 0. When the phase error signal becomes 0 (at (2) in FIG. 3), the HEAD CLK and the CLK are synchronized, and the control signals CNT1 and CNT3 are changed to LOW (at (3) in FIG. 3), thereby completing the synchronizing processing on a clock signal CLK.

Note, according to the configuration shown in FIG. 2, the HEAD CLK also enters the phase difference detector 55 for a HD signal, however, by opening the switch 56 by controlling the control signal CNT2 to be LOW while the control signal CNT1 is HIGH, no signal is transferred to the synchronizing signal phase shifter 57.

Next, the synchronizing processing on a HD signal is explained. The CPU 2 requests, via the communication signal TX, the camera head 9 to output a HD signal. At the same time, the CPU 2 controls the switch 56 to close by the control signal CNT2 while the HD signal is inputted from the camera head 9. The HD signal (called "HEAD HD", hereinafter, for distinguishing from other HD signals) which is selected by the switch circuit 3 of the camera head 9 in response to the change of the control signal CNT4 from LOW to HIGH (timing (4) in FIG. 4) and kept transmitted during a period (b) in FIG. 4 enters the phase difference detector 55. Further, a HD signal (simply referred as "HD", hereinafter) from the SSG 12 is also inputted to the phase difference detector 55. The phase difference detector 55 compares the HEAD HD and HD, and when the phases of the HEAD HD and HD are different from each other, it outputs a phase error signal to the synchronizing signal phase shifter 57 via the switch 56. In a case shown in FIG. 4, the HD and HEAD HD are out of phase by an amount "phase difference" shown by broken lines.

Upon receiving the phase error signal, the synchronizing signal phase shifter 57 shifts the phase of the HD signal of the composite signal SYNC to be transmitted to the camera head 9 so that the phase error signal becomes 0. When the phase error signal becomes 0 (at (5) in FIG. 4), the HEAD HD and the HD are synchronized, and the control signals CNT2 and CNT4 are changed to LOW (at (6) in FIG. 4), thereby completing the synchronizing processing on a HD signal.

Note, similarly to HEAD CLK, according to the configuration shown in FIG. 2, the HEAD HD also enters the phase difference detector 54 for a clock signal CLK, however, by opening the switch 53 by controlling the control signal CNT1 to be LOW while the control signal CNT2 is HIGH, no signal is transferred to the phase shifter 52.

In the synchronizing processing in which the HEAD CLK and HEAD HD switched by the switch circuit 3 are inputted to the phase control unit 5 where the phases of a clock signal 2CLK and a HD signal are adjusted on the basis of the input HEAD CLK and HEAD HD and the phase-adjusted clock signal 2CLK and the HD signal are fed back to the camera head 9, the synchronizing processing is performed after confirming timing of the control signals CNT1, CNT2, CNT3, and CNT4 by communicating between the CPU 1 and CPU 2 via the communication signals TX and RX. Therefore, the delay time in the cable 8 is absorbed.

By performing the aforesaid synchronizing processing, it is possible to synchronize timing for reading CCD signals in the camera head 9 with timing of the digital signal processor (DSP) 70 of the signal processing unit 10 on the basis of the clock signal CLK and the HD signal.

According to the embodiment as described above, synchronizing signals, such as a clock signal and a horizontal synchronizing signal, and a CCD signal are transmitted from a camera head to a signal processing unit via a single signal line by switching between them by a switch circuit. Therefore, delay time of the synchronizing signal and the CCD signal due to the length of the cable are absorbed, problems in which synchronization is not established and which color signals are reversed because of signal delay in cable do not arise.

Further, by outputting a horizontal signal, a clock signal, and a CCD signal through a single signal line by switching among the signals, it is possible to reduce the number of signal lines as well as reduce the effect of the signal delay due to the cable length.

In the above embodiment, the synchronizing processing on a clock signal is performed first, then the synchronizing processing on the horizontal synchronizing signal is performed. However, the present invention is not limited to this order, and the synchronizing processing may be performed in other order.

Further, the synchronizing processing is performed when the power is turned on or just after the camera head 9 and the signal processing unit 10 are connected, however, the present invention is not limited to this, and it is possible to regularly perform the synchronizing processing in the middle of image sensing operation by interrupting every predetermined period.

Further, an example of connecting a camera head and a signal processing unit via a cable is explained, however, the present invention is applicable to cases in which arbitrary electronic devices are connected, or an electronic device and its peripheral devices are connected via cable.

Furthermore, it is possible to configure a signal processing unit with an extension board, so that the extension board can be utilized upon insertion into a slot of a personal computer, a work station, and so on.

The present invention is not limited to the above embodiments and various changes and modifications can be made within the spirit and scope of the present invention. Therefore to appraise the public of the scope of the present invention, the following claims are made.

What is claimed is:

1. A signal processing apparatus which is used by connecting an external device, said apparatus comprising:
   transmission means for transmitting reference signals to the external device;
   control means for controlling the external device so as to output first and second signals in sequence;
   reception means for receiving the first and second signals in sequence; and
   phase shifting means for establishing synchronization with the external device by sequentially shifting phases of the reference signals on the basis of the first and second signals received by said reception means,
   wherein said first signal is a pixel clock signal and said second signal is a video synchronizing signal, and said transmission means transmits the reference signals shifted by said phase shifting means.

2. The signal processing apparatus according to claim 1, wherein the first and second signals are transmitted via a single signal line.

3. The signal processing apparatus according to claim 2, wherein an image signal is transmitted via the single signal line.

4. The signal processing apparatus according to claim 1, wherein the reference signals includes a clock signal, a horizontal synchronizing signal, and a vertical synchronizing signal.

5. The signal processing apparatus according to claim 1, wherein said phase shifting means includes detecting means for detecting phase differences between phases of the first and second signals sequentially inputted from the external device and phases of the reference signals respectively corresponding to the first and second signals, and said phase shifting means sequentially shifts the phases of the reference signals so that the phase differences detected by said detecting means reduce.

6. The signal processing apparatus according to claim 1 further comprising input means for inputting a synchronizing signal from an external device,
   wherein the reference signals are based on the synchronizing signal inputted by said input means.

7. The signal processing apparatus according to claim 6, wherein the synchronizing signal includes a clock signal, a horizontal synchronizing signal, and a vertical synchronizing signal.

8. The signal processing apparatus according to claim 1, wherein said signal processing apparatus is in a form of an extension board.

9. An image sensing apparatus which is used by connecting an external device, comprising:
   first input means for inputting reference signals from the external device;
   second input means for inputting a control signal from the external device; and
   selection means for selecting a first and a second signal in sequence, generated on the basis of the reference signals inputted by said first input means and on the basis of the control signal inputted by said second input means, and outputting the selected signal,
   wherein said first signal is a pixel clock signal and said second signal is a video synchronizing signal.

10. The image sensing apparatus according to claim 9, wherein the first and second signals are outputted via a single signal line.

11. The image sensing apparatus according to claim 10, wherein the an image signal is transmitted via the single signal line.

12. The image sensing apparatus according to claim 9, wherein the reference signals includes a clock signal, a horizontal synchronizing signal, and a vertical synchronizing signal.

13. An image sensing system having an image sensing apparatus and a signal processing apparatus comprising;
   communication means for transmitting reference signals from the signal processing apparatus to the image sensing apparatus;
   control means for controlling the image sensing apparatus so as to sequentially output first and second signals generated on the basis of the reference signals;
   selection means for selecting the first and second signals in sequence under control of said control means; and
   phase shifting means for synchronizing between the signal processing apparatus and the image sensing apparatus by sequentially shifting phases of the reference signals on the basis of the first and second signals selected by said selection means,
   wherein said first signal is a pixel clock signal and said second signal is a video synchronizing signal, and said communication means transmits the reference signals shifted by said phase shifting means.

14. The image sensing system according to claim 13, wherein the first and second signals are outputted to said phase shifting means in sequence via a single signal line.

15. The image sensing system according to claim 14, wherein an image signal is transmitted via the single signal line.

16. The image sensing system according to claim 13, wherein the reference signals includes a clock signal, a horizontal synchronizing signal, and a vertical synchronizing signal.

17. The image sensing system according to claim 13, wherein said phase shifting means includes detecting means for detecting phase differences between phases of the first and second signals inputted from the external device and phases of the reference signals respectively corresponding to the first and second signals, and said phase shifting means sequentially shifts the phases of the reference signals so that the phase differences detected by said detecting means reduce.

18. The image sensing system according to claim 13 further comprising input means for inputting a synchronizing signal from an external device,
   wherein the reference signals are based on the synchronizing signal inputted by said input means.

19. The image sensing system according to claim 18, wherein the synchronizing signal includes a clock signal, a horizontal synchronizing signal, and a vertical synchronizing signal.

20. The image sensing system according to claim 13, wherein said signal processing apparatus is in a form of an extension board.

21. A synchronizing method for establishing synchronization between two different devices which are used by connecting to each other, comprising:
   a transmission step of transmitting reference signals from a first device to a second device;
   a selection step of selecting first and second signals in sequence in the second device under control of the first device; and
   a phase shifting step of synchronizing between the first device and the second device by sequentially shifting phases of the reference signals on the basis of the first and second signals selected in said selection step; and
   a transmission step of transmitting the reference signals,
   wherein said first signal is a pixel clock signal and said second signal is a video synchronizing signal, and said transmission step keeps transmitting the reference signals as the reference signals are shifted in said phase shifting step.

22. The synchronizing method according to claim 21, wherein the first and second signals are outputted via a single signal line.

23. The synchronizing method according to clam 22, where an image signal is transmitted via the single signal line.

24. The synchronizing method according to claim 21, wherein the reference signals includes a clock signal, a horizontal synchronizing signal, and a vertical synchronizing signal.

25. The synchronizing method according to claim 21, wherein said phase shifting step includes a detecting step of detecting phase differences between phases of the first and second signals selected at said selection step and phases of the reference signals respectively corresponding to the first and second signals, and, in said phase shifting step, the phases of the reference signals are sequentially shifted so that the phase differences detected in said detecting step reduce.

26. The synchronizing method according to claim 21 further comprising an input step of inputting a synchronizing signal from an external device,
   wherein the reference signals are based on the synchronizing signal inputted in said input step.

27. The synchronizing method according to claim 26, wherein the synchronizing signal includes a clock signal, a horizontal synchronizing signal, and a vertical synchronizing signal.

28. The synchronizing method according to claim 21, wherein said selection step and said phase shifting step are performed when powers of the devices are turned on.

29. The synchronizing method according to claim 21, wherein said selection step and said phase shifting step are performed just after the first and second devices are connected.

30. The synchronizing method according to claim 21, wherein said selection step and said phase shifting step are performed every predetermined period.

* * * * *

UNITED STATES PATENT AND TRADEMARK OFFICE
CERTIFICATE OF CORRECTION

PATENT NO.   : 6,449,007 B1
DATED        : September 10, 2002
INVENTOR(S)  : Toshihiko Yokoyama It is certified that error appears in the above-identified patent and that said Letters Patent is hereby corrected as shown below:

<u>Title page,</u>
Item [56], References Cited, U.S. PATENT DOCUMENTS,
"5,851,257   A *   12/1998   Sakata…………348/241" should read
-- 5,850,257   A *   12/1998   Sakata…………348/241 --

Signed and Sealed this

Twenty-second Day of July, 2003

JAMES E. ROGAN
*Director of the United States Patent and Trademark Office*